US011016716B2

(12) United States Patent
Feng (10) Patent No.: US 11,016,716 B2
(45) Date of Patent: May 25, 2021

(54) PICTURE INTERFACE DISPLAY METHOD AND APPARATUS ACCORDING TO JUMP PROTOCOL

(71) Applicants: Beijing Jingdong Shangke Information Technology Co., Ltd., Beijing (CN); Beijing Jingdong Century Trading Co., Ltd., Beijing (CN)

(72) Inventor: Yihua Feng, Beijing (CN)

(73) Assignees: Beijing Jingdong Shangke Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 0 days.

(21) Appl. No.: 16/627,951

(22) PCT Filed: Jul. 6, 2018

(86) PCT No.: PCT/CN2018/094881
§ 371 (c)(1),
(2) Date: Dec. 31, 2019

(87) PCT Pub. No.: WO2019/024658
PCT Pub. Date: Feb. 7, 2019

(65) Prior Publication Data
US 2020/0133617 A1    Apr. 30, 2020

(30) Foreign Application Priority Data
Jul. 31, 2017    (CN) .......................... 201710636694.1

(51) Int. Cl.
*G06F 16/955* (2019.01)
*G06F 3/14* (2006.01)
(Continued)

(52) U.S. Cl.
CPC ........ *G06F 3/1454* (2013.01); *G06F 3/04842* (2013.01); *G06F 16/9566* (2019.01); *H04L 67/02* (2013.01)

(58) Field of Classification Search
CPC .............. G06F 3/1454; G06F 16/9566; G06F 3/04842; H04L 67/02
See application file for complete search history.

(56) References Cited

U.S. PATENT DOCUMENTS

| 10,467,615 B1 * | 11/2019 | Omojola ............ G06Q 30/0637 |
| 2015/0058369 A1 * | 2/2015 | Kong .................... G06F 16/958 707/756 |

(Continued)

FOREIGN PATENT DOCUMENTS

| CN | 105302442 A | 2/2016 |
| CN | 105824836 A | 8/2016 |
| CN | 107390994 A | 11/2017 |

OTHER PUBLICATIONS

International Search Report and Written Opinion for PCT/CN2018/094881, dated Sep. 30, 2018, 2 pages.

*Primary Examiner* — Beau D Spratt
(74) *Attorney, Agent, or Firm* — Blank Rome LLP (57) ABSTRACT

A method and an apparatus for presenting an interface are provided according to the embodiments of the present disclosure. The method includes performing a detecting for a click operation on a shared picture; determining, in response to detecting the click operation, whether an original source application of the picture indicated by an application identifier is already installed locally based on the application identifier; and in response to determining that the original source application is already installed locally, constructing a content of a jump protocol pre-associated with the picture based on the application identifier and parameter information pre-associated with the picture, and executing (Continued)

the constructed jump protocol to open the locally installed original source application and present an interface corresponding to the picture.

15 Claims, 5 Drawing Sheets

(51) Int. Cl.
*G06F 3/0484* (2013.01)
*H04L 29/08* (2006.01)

(56) References Cited

U.S. PATENT DOCUMENTS

| | | |
|---|---|---|
| 2015/0172240 A1 | 6/2015 | Back |
| 2016/0234330 A1* | 8/2016 | Popowitz ............ H04L 67/2814 |
| 2017/0192766 A1* | 7/2017 | Sogani .................... H04L 67/02 |
| 2018/0103109 A1* | 4/2018 | Jaladi ...................... H04L 67/02 |
| 2020/0242303 A1* | 7/2020 | Hwang ................... G06F 21/32 |

* cited by examiner

PICTURE INTERFACE DISPLAY METHOD AND APPARATUS ACCORDING TO JUMP PROTOCOL

This patent application is a national stage of International Application No. PCT/CN2018/094881, filed on Jul. 6, 2018, which claims priority to Chinese Patent Application No. 201710636694.1, filed on Jul. 31, 2017. The contents of those applications are incorporated herein by reference in their entireties.

TECHNICAL FIELD

The present disclosure relates to the field of computer technology, specifically to the field of Internet technology, and in particular to a method and apparatus for presenting an interface.

BACKGROUND

Most of applications in the market now support screenshot sharing, and channels for information transmission are thus more abundant. Such screenshot sharing scenario is used very frequently in our daily life.

At present, after a captured picture is shared, a user clicking on the shared picture usually opens a simple picture instead of an interface associated with content presented by the picture. If the user wants to further understand information associated with the content presented by the picture, he/she also needs to manually search for the information in a corresponding application, which complicates the user operation.

SUMMARY

The object of embodiments of the present disclosure is to provide an improved method and apparatus for presenting an interface to solve the technical problems mentioned in the background section.

In a first aspect of the present disclosure, a method for presenting an interface is provided. The method includes performing a detection for a click operation on a shared picture, where the picture is pre-associated with an application identifier, a jump protocol and parameter information, the application identifier being an application identifier of an original source application of the picture, and the parameter information being parameter information of an interface corresponding to the picture in the original source application; determining, in response to detecting the click operation, whether the original source application is already installed locally based on the application identifier; and constructing, in response to determining that the original source application is already installed locally, a content of the jump protocol based on the application identifier and the parameter information, and executing the constructed jump protocol to open the locally installed original source application and present the interface.

In some embodiments, the picture is further pre-associated with a uniform resource locator URL, and the URL is a URL of a webpage that is included in a website corresponding to the original source application and used for presenting a content of the picture; and the method further includes: presenting, in response to determining that the original source application is not installed locally, the webpage indicated by the URL.

In some embodiments, the picture is further pre-associated with a download address set of the original source application; and the method further includes: selecting, in response to determining that the original source application is not installed locally, a download address from the download address set as a target download address, and presenting a download interface indicated by the target download address.

In some embodiments, the selecting a download address from the download address set as a target download address includes: determining whether a first download address associated with a locally installed first application for downloading an application is included in the download address set, and if the first download address associated with the locally installed first application for downloading an application is included in the download address set, using the first download address as the target download address.

In some embodiments, the download address set includes a download address pointing to the webpage; and the selecting a download address from the download address set as a target download address includes: in response to determining that the first download address is not included in the download address set, using the download address pointing to the webpage in the download address set as the target download address.

In some embodiments, the original source application supports a screenshot function, and the picture is captured by an original source client of the picture using a screenshot function supported by the original source application installed in the original source client, the picture being shared by the original source client by performing the following steps: acquiring, in response to detecting the sharing operation on the picture, pre-stored jump information associated with the original source application, and encapsulating the picture, the parameter information and the jump information to obtain an encapsulated data packet, where the jump information includes the application identifier and the jump protocol; and transmitting, in response to receiving a transmitting instruction for the picture, the data packet to a target application indicated by the transmitting instruction, so that the target application displays the picture and stores data in the data packet.

In a second aspect of the present disclosure, an apparatus for presenting an interface is provided. The apparatus includes a detection unit, configured for performing a detection for a click operation on a shared picture, where the picture is pre-associated with an application identifier, a jump protocol and parameter information, the application identifier being an application identifier of an original source application of the picture, and the parameter information being parameter information of an interface corresponding to the picture in the original source application; a determination unit, configured for determining, in response to detecting the click operation, whether the original source application is already installed locally based on the application identifier; and a presentation unit, configured for constructing, in response to determining that the original source application is already installed locally installed locally, a content of the jump protocol based on the application identifier and the parameter information, and executing the constructed jump protocol to open the locally installed original source application and present the interface.

In some embodiments, the picture is further pre-associated with a uniform resource locator URL, and the URL is a URL of a webpage that is included in a website corresponding to the original source application and used for presenting a content of the picture; and the apparatus further includes: a first presentation unit, configured for presenting, in response to determining that the original source application is not installed locally, the webpage indicated by the URL.

In some embodiments, the picture is further pre-associated with a download address set of the original source application; and the apparatus further includes: a second presentation unit, configured for selecting, in response to determining that the original source application is not installed locally, a download address from the download address set as a target download address, and presenting a download interface indicated by the target download address.

In some embodiments, the second presentation unit includes: a first determination subunit, configured for determining whether a first download address associated with a locally installed first application for downloading an application is included in the download address set, and if the first download address associated with the locally installed first application for downloading an application is included in the download address set, using the first download address as the target download address.

In some embodiments, the download address set includes a download address pointing to the webpage; and the second presentation unit include: a second determination subunit, configured for using the download address pointing to the webpage in the download address set as the target download address in response to determining that the first download address is not included in the download address set.

In some embodiments, the original source application supports a screenshot function, and the picture is captured by an original source client of the picture using a screenshot function supported by the original source application installed in the original source client, the picture being shared by the original source client by performing the following steps: acquiring, in response to detecting the sharing operation on the picture, pre-stored jump information associated with the original source application, and encapsulating the picture, the parameter information and the jump information to obtain an encapsulated data packet, where the jump information includes the application identifier and the jump protocol; and transmitting, in response to receiving a transmitting instruction for the picture, the data packet to a target application indicated by the transmitting instruction, so that the target application displays the picture and stores data in the data packet.

In a third aspect of the present disclosure, an electronic device is provided, including one or more processors; and a storage apparatus for storing one or more programs, where the one or more programs, when executed by the one or more processors, cause the one or more processors to implement the method according to the first aspect.

In a fourth aspect of the present disclosure, a computer readable storage medium is provided, storing a computer program thereon, where the program, when executed by a processor, implements the method according to the first aspect.

The method and apparatus for presenting an interface provided by the embodiments of the present disclosure include: performing a detecting for a click operation on a shared picture; determining, in response to detecting the click operation, whether an original source application of the picture indicated by an application identifier is already installed locally based on the application identifier; and in response to determining that the original source application is already installed locally, constructing a content of a jump protocol pre-associated with the picture based on the application identifier and parameter information pre-associated with the picture, and executing the constructed jump protocol to open the locally installed original source application and present an interface corresponding to the picture. Therefore, the application identifier, the jump protocol and the parameter information which are pre-associated with the picture are effectively utilized, and whether the original source application is installed locally is determined, thereby achieving an interface display with high pertinence.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts associated with the relevant disclosure are shown in the accompanying drawings.

It should be noted that some embodiments in the present disclosure and some features in the embodiments may be combined with each other on a non-conflict basis. The present disclosure will be described below in detail with reference to the accompanying drawings and in combination with embodiments.

Figure 1:
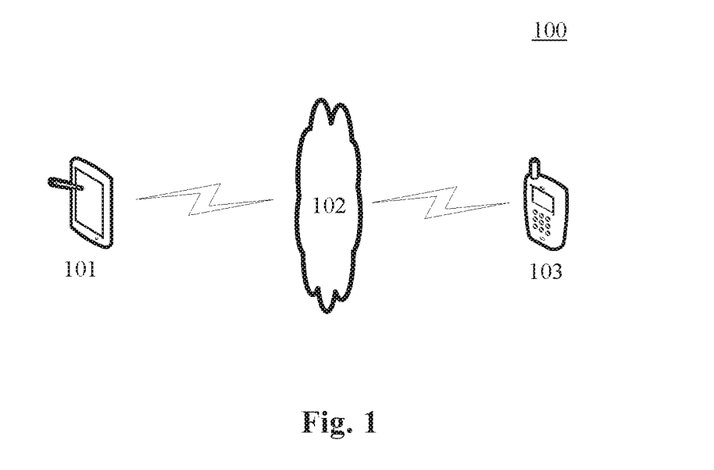
FIG. 1 is a diagram of an example system architecture in which the present disclosure may be implemented.

FIG. 1 shows an example system architecture 100 in which a method or an apparatus for presenting an interface according to some embodiment of the present disclosure may be implemented.

As shown in FIG. 1, the system architecture 100 may include terminal devices 101 and 103 and a network 102. The network 102 serves as a medium providing a communication link between the terminal device 101 and the terminal device 103. The network 102 may include various types of connections, such as wired or wireless communication links, or optical fibers.

A user may use the terminal device 101 to interact with the terminal device 103 by means of the network 102 so as to receive or transmit information and the like. For example, the user may use the terminal device 101 to receive a picture shared by the terminal device 103, and the terminal device 101 may perform a detection for a click operation on the picture and execute a corresponding processing step when the click operation is detected, so as to present a corresponding interface (for example, an interface for presenting a content of the picture). Various communication client applications, such as web browser application, shopping application, game application, social platform software and software download application, may be installed in the terminal devices 101 and 103.

The terminal devices 101 and 103 may be various electronic devices with display screens, including but not limited to smart phones, tablets, e-book readers, MP3 (Moving Picture Experts Group Audio Layer III) players, MP4 (Moving Picture Experts Group Audio Layer IV) players, laptop portable computers and desktop computers.

It should be noted that the method for presenting an interface provided by some embodiments of the present disclosure is generally executed by the terminal device 101, and the apparatus for presenting an interface is generally arranged in the terminal device 101.

It should be noted that if the shared picture is shared by the terminal device 101 itself, the system architecture 100 may not include the terminal device 103.

It should be understood that the numbers of the terminal devices and networks in FIG. 1 are merely illustrative. Any number of terminal devices and networks may be provided based on actual requirements.

Figure 2:
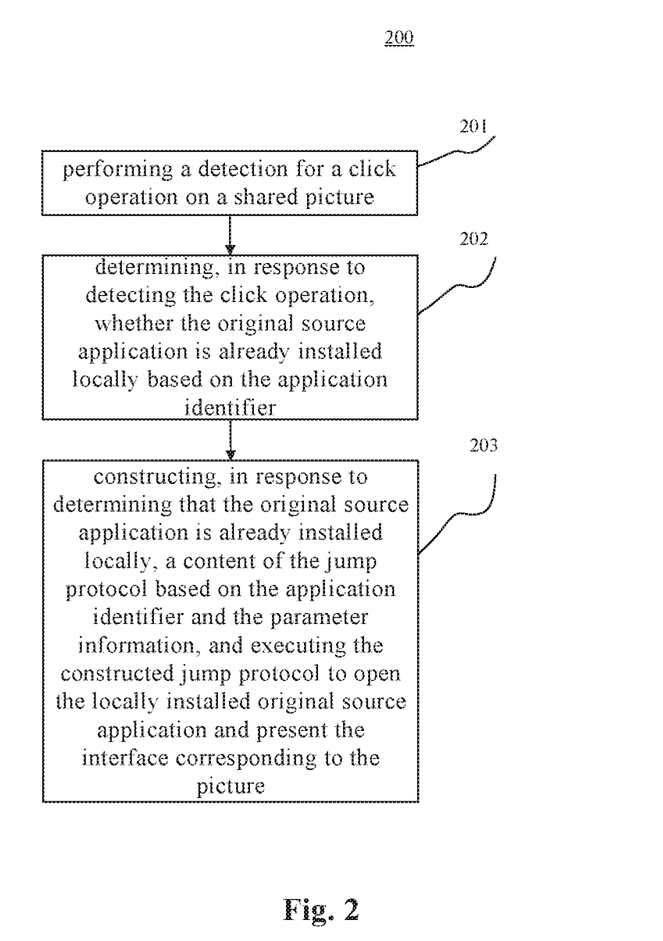
FIG. 2 is a flowchart of a method for presenting an interface according to an embodiment of the present disclosure.

Further, referring to FIG. 2, a flow 200 of a method for presenting an interface according to an embodiment of the present disclosure is shown. The method for presenting an interface includes the following steps.

Step 201: performing a detection for a click operation on a shared picture.

In the present embodiment, an electronic device (for example, the terminal device 101 shown in FIG. 1) on which the method for presenting an interface is implemented may perform the detection for the click operation on the shared picture in real time. The picture may be pre-associated with an application identifier, a jump protocol and parameter information. The application identifier may be an application identifier of an original source application of the picture, for example, the application name (for example, "XX microblog", "** mall") of the original source application. The jump protocol may be, for example, an openApp protocol. The openApp protocol may achieve a jump between different interfaces of a given application, and may also achieve a jump between different applications. Since the openApp protocol is a well-known technology widely studied and applied at present, the openApp protocol will not be described here. The parameter information may be parameter information of an interface corresponding to the picture in the original source application, and the parameter information may include, for example, a class name of a view controller class corresponding to the interface. The view controller class here may be used to create a view managed thereby. The view controller class is an abstract class without a visual representation. Generally, the view managed by the view controller class provides a visual canvas. Since the view controller class is a well-known technology widely studied and applied at present, the view controller class will not be described here. The click operation may be a click operation triggered by the user using a mouse, a stylus pen, or a part (for example, a finger) of his/her body, and the present embodiment does not limit such contents. It should be noted that the application identifier, the parameter information and the jump protocol may be pre-stored in the electronic device locally, or may be pre-stored in a server remotely connected to the electronic device.

In some optional implementations of the present embodiment, the picture may alternatively be pre-associated with a URL (Uniform Resource Locator) and/or a download address set of the original source application. The URL may be a URL of a webpage that is included in a website corresponding to the original source application and used for presenting a content of the picture. The download address set may include, for example, the download address of the original source application in a specified software download application, and may also include a download address pointing to the webpage. Here, the download address in the specified software download application may include an application identifier of the specified software download application and parameter information of a download interface indicated by the download address, and the parameter information may include, for example, a class name of a view controller class corresponding to the download interface.

In some optional implementations of the present embodiment, the original source application may support a screenshot function, and the picture may be captured by an original source client of the picture using a screenshot function supported by the installed original source application. The picture may be shared by the original source client by performing the following steps: acquiring, in response to detecting the sharing operation on the picture, pre-stored jump information associated with the original source application, and encapsulating the picture, the parameter information and the jump information to obtain an encapsulated data packet, where the jump information includes the application identifier and the jump protocol; and transmitting, in response to receiving a transmitting instruction for the picture, the data packet to a target application indicated by the transmitting instruction, so that the target application displays the picture and stores data in the data packet. As an example, the target application, after receiving the data packet, may decapsulate the data packet, extract the data (that is, the picture, the parameter information and the jump information) from the data packet, display the picture, and store the data in a device where the target application is located or a server supporting the target application.

It should be noted that data encapsulation, in general, is to map service data to a payload of an encapsulation protocol, and then fill a header of a corresponding protocol to form a data packet of the encapsulation protocol and to complete rate adaptation. Decapsulation is an inverse process of the encapsulation, which includes disassembling a protocol packet, processing information in the header, and extracting service information from the payload. The data encapsulation and decapsulation are a pair of inverse processes. Here, the original source client may use a preset encapsulation protocol to encapsulate the picture, the parameter information and the jump information, and the present embodiment does not limit the preset encapsulation protocol in any way. The data packet may be a data packet in a preset format, and the preset format may be, for example, a JSON (JavaScript Object Notation) format. The JSON is a lightweight data exchange format with a concise and clear hierarchical structure, and is thus easy to be read and written by humans, and also easy to be parsed and generated by machines, which may effectively improve the network transmission efficiency.

The original source application here may be pre-associated with a sharing component, and the sharing operation may be triggered when a sharing component associated with the original source application installed in the original source client is invoked. In addition, the sharing component may provide one or more sharing channels (such as "** microblog", "## microblog" and chat tool), and the sharing channel may be set by a server providing support to the original source application. The jump information may be pre-stored locally in the original source client, or may be stored in the server remotely connected to the original source client. Optionally, the jump information may further include the URL and/or the download address set. The parameter information may be recorded by the original source application installed in the original source client to a specified location when the sharing operation is triggered. It should be noted that the original source client may share the picture by means of the installed original source application.

Step 202: determining, in response to detecting the click operation, whether the original source application is already installed locally based on the application identifier.

In the present embodiment, in response to detecting the click operation on the picture in step 201, the electronic device may determine whether the original source application is already installed locally based on the application identifier. For example, the electronic device may pre-store application identifiers of installed applications locally, and the electronic device may compare the application identifier of the original source application with the application identifiers of the installed applications stored locally to determine whether the original source application is already installed locally.

In some optional implementations of the present embodiment, the electronic device may further pre-store an application name set, the application name set including the application names of the applications installed in the electronic device locally. The application identifier and the application name of the original source application may be pre-stored associatively, for example, stored in the electronic device locally or the server remotely connected to the electronic device. The electronic device may acquire the application name of the original source application according to the application identifier thereof, and determine whether the application name set includes the application name of the original source application. If the application name set includes the application name of the original source application, the electronic device may determine the original source application being already installed locally.

Step 203: constructing, in response to determining that the original source application is already installed locally, a content of the jump protocol based on the application identifier and the parameter information, and executing the constructed jump protocol to open the locally installed original source application and present the interface corresponding to the picture.

In the present embodiment, the electronic device, in response to determining that the original source application is already installed locally in step 202, may construct the content of the jump protocol based on the application identifier and the parameter information which are pre-associated with the picture, and execute the constructed jump protocol to open the locally installed original source application and present the interface corresponding to the picture. As an example, assuming that the parameter information includes a class name of a view controller class, the electronic device may set the application identifier as a jump destination in the jump protocol, and set the class name as a jump parameter in the jump protocol, so as to construct the content of the jump protocol. The electronic device may execute the constructed jump protocol to open the locally installed original source application and initialize an interface of the original source application, so as to present the interface corresponding to the picture.

In some optional implementations of the present embodiment, if the parameter information further includes a view identifier of a view created by the view controller class, the electronic device may set the application identifier as a jump destination in the jump protocol, and set the class name and the view identifier as jump parameters in the jump protocol, so as to construct the content of the jump protocol.

In some optional implementations of the present embodiment, if it is determined that the original source application is not installed locally in the electronic device, the electronic device may present a webpage indicated by the URL. For example, the electronic device opens a default browser application and presents the webpage in the browser application.

In some optional implementations of the present embodiment, if it is determined that the original source application is not installed locally in the electronic device, the electronic device may alternatively select a download address from the download address set as a target download address, and present a download interface indicated by the target download address. For example, the electronic device may determine whether a first download address associated with a locally installed first application for downloading an application is included in the download address set, and if the first download address associated with the locally installed first application for downloading an application is included in the download address set, use the first download address as the target download address. The electronic device here may determine whether a download address including an application identifier of the first application is included in the download address set, and if the download address including the application identifier of the first application is included in the download address set, determine the download address as a first download address associated with the first application.

In some optional implementations of the present embodiment, if the electronic device determines that the first download address is not included in the download address set, the electronic device may use the download address pointing to the webpage in the download address set as the target download address.

Figure 3:
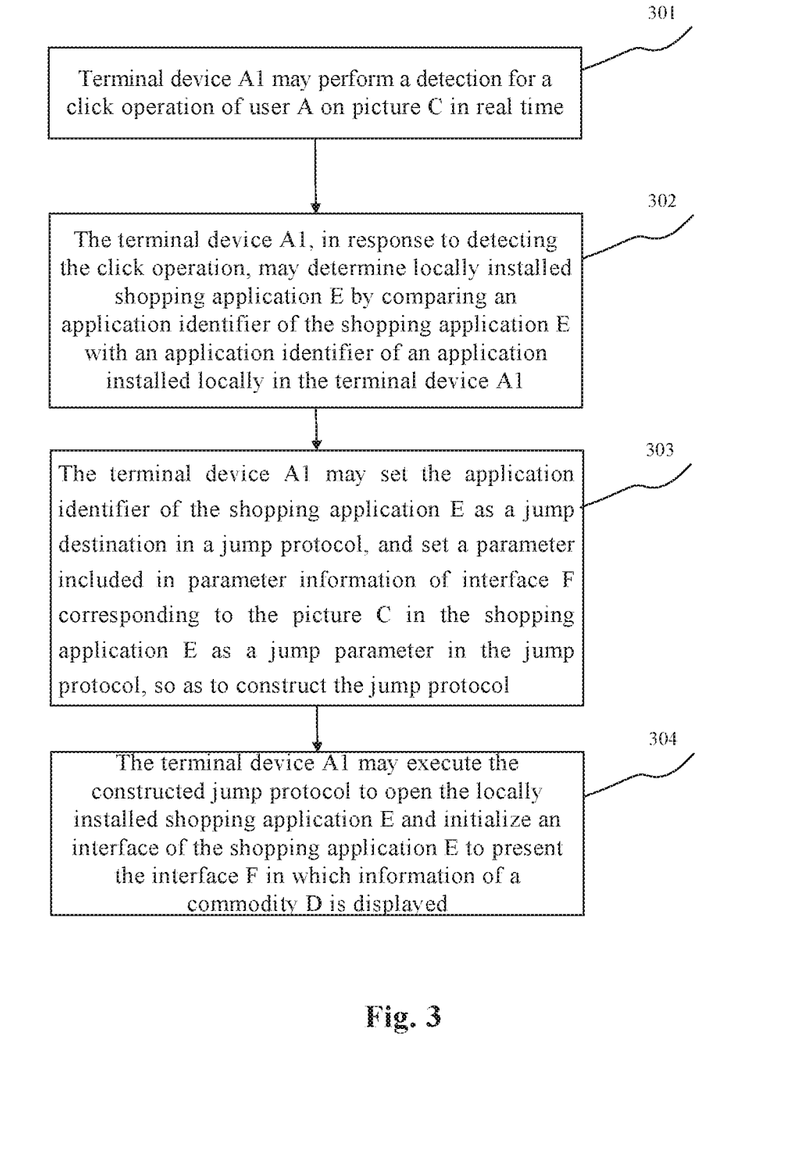
FIG. 3 is a schematic diagram of an application scenario of the method for presenting an interface according to the present disclosure.

Further referring to FIG. 3, FIG. 3 is a schematic diagram of an application scenario of the method for presenting an interface according to the present example. In the application scenario of FIG. 3, user A may, by means of terminal device A1, receive picture C shared by user B through terminal device B2. The content of the picture C is information about commodity D, and an original source application of the picture C is shopping application E. The picture C is pre-associated with an application identifier of the shopping application E, a jump protocol (for example, an openapp protocol) and parameter information (for example, a class name of a view controller class corresponding to an interface F corresponding to the picture C in the shopping application E)). Thereafter, as shown by reference numeral 301, the terminal device A1 may perform a detection for a click operation of the user A on the picture C in real time. Then, as shown by reference numeral 302, the terminal device A1, in response to detecting the click operation, may determine the locally installed shopping application E by comparing the application identifier with the application identifiers of the applications installed locally in the terminal device A1. Then, as indicated by reference numeral 303, the terminal device A1 may set the application identifier of the shopping application E as a jump destination in the jump protocol, and set a parameter (such as the class name) included in the parameter information as a jump parameter in the jump protocol, so as to construct the jump protocol. Finally, as shown by reference numeral 304, the terminal device A1 may execute the constructed jump protocol to open the locally installed shopping application E and initialize an interface of the shopping application E to present the interface F in which the information of the commodity D is displayed, so that the user A may understand the information of the commodity D in more detail.

The method provided by some embodiments of the present disclosure effectively utilizes the application identifier, the jump protocol and the parameter information which are pre-associated with the picture, and determines whether the original source application is installed locally, thereby achieving an interface display with high pertinence.

Figure 4:
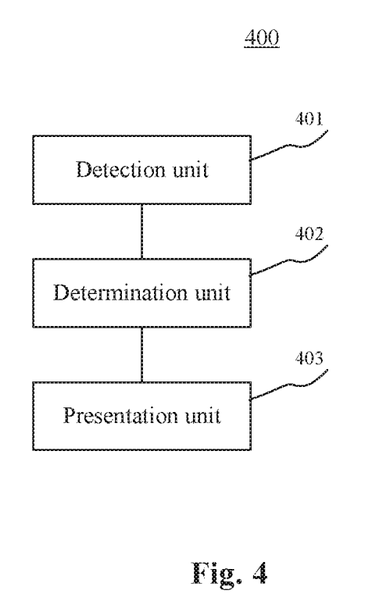
FIG. 4 is a schematic structural diagram of an apparatus for presenting an interface according to an embodiment of the present disclosure.

Further referring to FIG. 4, as an implementation of the method shown in the figures, the present disclosure provides an embodiment of an apparatus for presenting an interface. The apparatus embodiment corresponds to the method embodiment shown in FIG. 2, and the apparatus may be specifically applied in various electronic devices.

As shown in FIG. 4, the apparatus 400 for presenting an interface shown in the present embodiment includes a detection unit 401, a determination unit 402 and a presentation unit 403. The detection unit 401 is configured for performing a detection for a click operation on a shared picture, where the picture is pre-associated with an application identifier, a jump protocol and parameter information, the application identifier being an application identifier of an original source application of the picture, and the parameter information being parameter information of an interface corresponding to the picture in the original source application; the determination unit 402 is configured for determining, in response to detecting the click operation, whether the original source application is already installed locally based on the application identifier; and the presentation unit 403 is configured for constructing, in response to determining that the original source application is already installed locally, a content of the jump protocol based on the application identifier and the parameter information, and executing the constructed jump protocol to open the locally installed original source application and present the interface.

In the present embodiment, the specific processing of the detection unit 401, the determination unit 402 and the presentation unit 403 included in apparatus 400 for presenting the interface, and technical effects brought thereby may be respectively referred to steps 201, 202, and 203 in the embodiment corresponding to FIG. 2, and will thus not be repeated here.

In some optional implementations of the present embodiment, the picture is further pre-associated with a uniform resource locator URL, and the URL is a URL of a webpage that is included in a website corresponding to the original source application and used for presenting the content of the picture; and the apparatus 400 further includes a first presentation unit (not shown in the figure) configured for presenting, in response to determining that the original source application is not installed locally, a webpage indicated by the URL.

In some optional implementations of the present embodiment, the picture may further be pre-associated with a download address set of the original source application; and the apparatus 400 may further include a second presentation unit (not shown in the figure) configured for selecting, in response to determining that the original source application is not installed locally, a download address from the download address set as a target download address, and presenting a download interface indicated by the target download address.

In some optional implementations of the present embodiment, the second presentation unit may include a first determination subunit (not shown in the figure) configured for determining whether a first download address associated with a locally installed first application for downloading an application is included in the download address set, and if the first download address associated with the locally installed first application for downloading an application is included in the download address set, using the first download address as the target download address.

In some optional implementations of the present embodiment, the download address set may include a download address pointing to the webpage; and the second presentation unit may include a second determination subunit (not shown in the figure) configured for using the download address pointing to the webpage in the download address set as the target download address in response to determining that the first download address is not included in the download address set.

In some optional implementations of the present embodiment, the original source application supports a screenshot function, and the picture is captured by an original source client of the picture using a screenshot function supported by the installed original source application. The picture may be shared by the original source client by performing the following steps: acquiring, in response to detecting the sharing operation on the picture, pre-stored jump information associated with the original source application, and encapsulating the picture, the parameter information and the jump information to obtain an encapsulated data packet, where the jump information includes the application identifier and the jump protocol; and transmitting, in response to receiving a transmitting instruction for the picture, the data packet to a target application indicated by the transmitting instruction, so that the target application displays the picture and stores data in the data packet.

The apparatus provided by some embodiments of the present disclosure effectively utilizes the application identifier, the jump protocol and the parameter information which are pre-associated with the picture, and determines whether the original source application is installed locally, thereby achieving an interface display with high pertinence.

Figure 5:
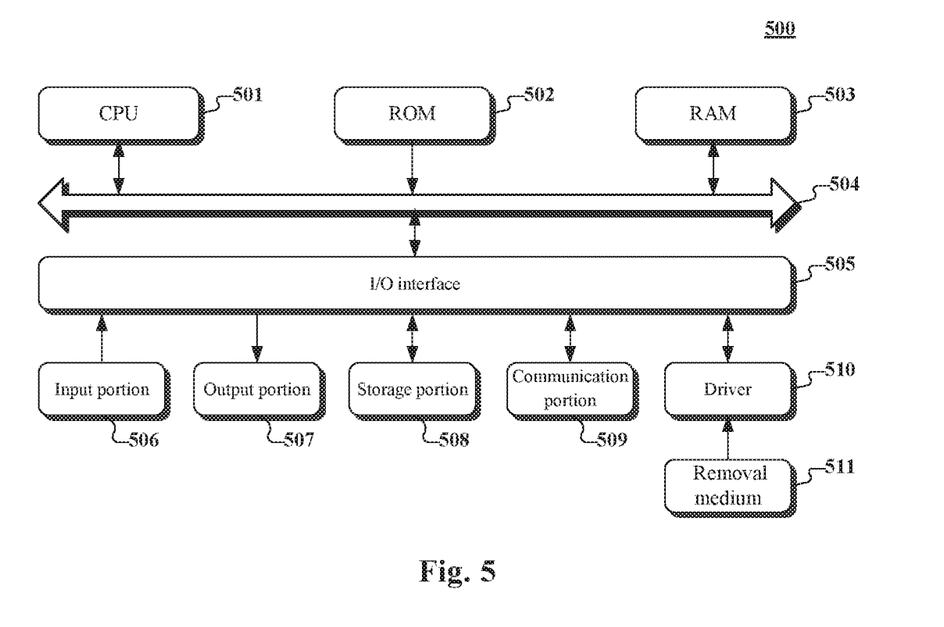
FIG. 5 is a schematic structural diagram of a computer system adapted to implement an electronic device according to embodiments of the present disclosure.

Referring to FIG. 5, a schematic structural diagram of a computer system 500 adapted to implement an electronic device according to embodiments of the present disclosure is shown. The electronic device shown in FIG. 5 is merely an example, and should not limit the function and scope of use of some embodiments of the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard and a mouse; an output portion 507 including a cathode ray tube (CRT), a liquid crystal display device (LCD) and a speaker; a storage portion 508 including a hard disk; and a communication portion 509 including a network interface card, such as an LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk and a semiconductor memory, may be mounted on the driver 510, so that a computer program read therefrom is installed on the storage portion 508 as needed.

In particular, according to embodiments of the present disclosure, the process described above with reference to the flowchart may be implemented as a computer software program. For example, an embodiment of the present disclosure includes a computer program product, which includes a computer program that is carried in computer-readable medium. The computer program includes program codes for executing the method as illustrated in the flowchart. In such an embodiment, the computer program may be downloaded from a network via the communication portion 509 and installed, and/or may be installed from the removable medium 511. The computer program, when executed by the central processing unit (CPU) 501, implements the functions as defined by a system of the present disclosure.

It should be noted that the computer readable medium in some embodiments of the present disclosure may be a computer readable signal medium or a computer readable storage medium or any combination of the above two. An example of the computer readable storage medium may include, but is not limited to: electric, magnetic, optical, electromagnetic, infrared, or semiconductor systems, apparatus, elements, or a combination of any of the above. A more specific example of the computer readable medium may include but is not limited to: an electrical connection with one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable medium may be any tangible medium containing or storing programs which may be used by a command execution system, apparatus or element or incorporated thereto. In some embodiments of the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The computer readable signal medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable and RF medium, or any suitable combination of the above.

The flowcharts and block diagrams in the accompanying drawings illustrate architectures, functions and operations that may be implemented according to the systems, methods and computer program products of the various embodiments of the present disclosure. In this regard, each of the blocks in the flowcharts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flowcharts as well as a combination of blocks may be implemented using a dedicated hardware-based system executing specified functions or operations, or by a combination of a dedicated hardware and computer instructions.

The units involved in some embodiments of the present disclosure may be implemented by means of software or hardware. The described units may also be provided in a processor, for example, described as: a processor including a detection unit, a determination unit and a presentation unit. In some case, names of these units do not constitute the definition of the units themselves, and the detection unit may also be described as "a unit configured for performing a detection for a click operation on a shared picture."

In another aspect, the present disclosure further provides a computer readable medium. The computer readable medium may be included in the electronic device in the above described embodiments, or a stand-alone computer readable medium not assembled into the electronic device. The computer readable medium stores one or more programs. The one or more programs, when executed by the electronic device, cause the electronic device to: perform a detection for a click operation on a shared picture, where the picture is pre-associated with an application identifier, a jump protocol and parameter information, the application identifier being an application identifier of an original source application of the picture, and the parameter information being parameter information of an interface corresponding to the picture in the original source application; determine, in response to detecting the click operation, whether the original source application is already installed locally based on the application identifier; and construct, in response to determining that the original source application is already installed locally, a content of the jump protocol based on the application identifier and the parameter information, and execute the constructed jump protocol to open the locally installed original source application and present the interface.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for presenting an interface, comprising:
performing a detection for a click operation on a shared picture, wherein the picture is pre-associated with an application identifier, a jump protocol and parameter information, the application identifier being an application identifier of an original source application of the picture, and the parameter information being parameter information of an interface corresponding to the picture in the original source application;
determining, in response to detecting the click operation, whether the original source application is already installed locally based on the application identifier; and constructing, in response to determining that the original source application is already installed locally, a content of the jump protocol based on the application identifier and the parameter information, and executing the constructed jump protocol to open the locally installed original source application and present the interface, wherein the original source application supports a screenshot function, and the picture is captured by an original source client of the picture using a screenshot function supported by the original source application installed in the original source client, the picture being shared by the original source client by performing the following steps:

acquiring, in response to detecting the sharing operation on the picture, pre-stored jump information associated with the original source application, and encapsulating the picture, the parameter information and the jump information to obtain an encapsulated data packet, wherein the jump information comprises the application identifier and the jump protocol, the jump protocol being executable for opening the original source application, wherein the picture is further pre-associated with a download address set of the original source application; and transmitting, in response to receiving a transmitting instruction for the picture, the data packet to a target application indicated by the transmitting instruction, so that the target application displays the picture and stores data in the data packet.

2. The method according to claim 1, wherein the picture is further pre-associated with a uniform resource locator URL, and the URL is a URL of a webpage that is comprised in a website corresponding to the original source application and used for presenting a content of the picture; and the method further comprises:
presenting, in response to determining that the original source application is not installed locally, the webpage indicated by the URL.

3. The method according to claim 1, wherein
the method further comprises:
selecting, in response to determining that the original source application is not installed locally, a download address from the download address set as a target download address, and presenting a download interface indicated by the target download address.

4. The method according to claim 3, wherein the selecting a download address from the download address set as a target download address comprises:
determining whether a first download address associated with a locally installed first application for downloading an application is included in the download address set, and if the first download address associated with the locally installed first application for downloading an application is included in the download address set, using the first download address as the target download address.

5. The method according to claim 4, wherein the download address set comprises a download address pointing to the webpage; and
the selecting a download address from the download address set as a target download address comprises:
in response to determining that the first download address is not included in the download address set, using the download address pointing to the webpage in the download address set as the target download address.

6. An apparatus for presenting an interface, comprising:
at least one processor; and a memory storing instructions, wherein the instructions when executed by the at least one processor, cause the at least one processor to perform operations, the operations comprising:

performing a detection for a click operation on a shared picture, wherein the picture is pre-associated with an application identifier, a jump protocol and parameter information, the application identifier being an application identifier of an original source application of the picture, and the parameter information being parameter information of an interface corresponding to the picture in the original source application;

determining, in response to detecting the click operation, whether the original source application is already installed locally based on the application identifier; and constructing, in response to determining that the original source application is already installed locally installed locally, a content of the jump protocol based on the application identifier and the parameter information, and executing the constructed jump protocol to open the locally installed original source application and present the interface, wherein the original source application supports a screenshot function, and the picture is captured by an original source client of the picture using a screenshot function supported by the original source application installed in the original source client, the picture being shared by the original source client by performing the following steps:

acquiring, in response to detecting the sharing operation on the picture, pre-stored jump information associated with the original source application, and encapsulating the picture, the parameter information and the jump information to obtain an encapsulated data packet, wherein the jump information comprises the application identifier and the jump protocol, the jump protocol being executable for opening the original source application, wherein the picture is further pre-associated with a download address set of the original source application; and transmitting, in response to receiving a transmitting instruction for the picture, the data packet to a target application indicated by the transmitting instruction, so that the target application displays the picture and stores data in the data packet.

7. The apparatus according to claim 6, wherein the picture is further pre-associated with a uniform resource locator URL, and the URL is a URL of a webpage that is comprised in a website corresponding to the original source application and used for presenting a content of the picture; and the operations further comprise:
presenting, in response to determining that the original source application is not installed locally, the webpage indicated by the URL.

8. The apparatus according to claim 6, wherein
the operations further comprise:
selecting, in response to determining that the original source application is not installed locally, a download address from the download address set as a target download address, and presenting a download interface indicated by the target download address.

9. The apparatus according to claim 8, wherein the selecting a download address from the download address set as a target download address comprises:
determining whether a first download address associated with a locally installed first application for downloading an application is included in the download address set, and if the first download address associated with the locally installed first application for downloading an application is included in the download address set, using the first download address as the target download address.

10. The apparatus according to claim 9, wherein the download address set comprises a download address pointing to the webpage; and
the selecting a download address from the download address set as a target download address comprises:
using the download address pointing to the webpage in the download address set as the target download address in response to determining that the first download address is not included in the download address set.

11. A non-transitory computer readable storage medium, storing a computer program, wherein the computer program, when executed by a processor, causes the processor to perform operations, the operations comprising:
performing a detection for a click operation on a shared picture, wherein the picture is pre-associated with an application identifier, a jump protocol and parameter information, the application identifier being an application identifier of an original source application of the picture, and the parameter information being parameter information of an interface corresponding to the picture in the original source application;
determining, in response to detecting the click operation, whether the original source application is already installed locally based on the application identifier; and
constructing, in response to determining that the original source application is already installed locally, a content of the jump protocol based on the application identifier and the parameter information, and executing the constructed jump protocol to open the locally installed original source application and present the interface, wherein the original source application supports a screenshot function, and the picture is captured by an original source client of the picture using a screenshot function supported by the original source application installed in the original source client, the picture being shared by the original source client by performing the following steps:
acquiring, in response to detecting the sharing operation on the picture, pre-stored jump information associated with the original source application, and encapsulating the picture, the parameter information and the jump information to obtain an encapsulated data packet, wherein the jump information comprises the application identifier and the jump protocol, the jump protocol being executable for opening the original source application, wherein the picture is further pre-associated with a download address set of the original source application; and
transmitting, in response to receiving a transmitting instruction for the picture, the data packet to a target application indicated by the transmitting instruction, so that the target application displays the picture and stores data in the data packet.

12. The non-transitory computer readable storage medium according to claim 11, wherein the picture is further pre-associated with a uniform resource locator URL, and the URL, is a URL of a webpage that is comprised in a website corresponding to the original source application and used for presenting a content of the picture; and
the operations further comprise:
presenting, in response to determining that the original source application is not installed locally, the webpage indicated by the URL.

13. The non-transitory computer readable storage medium according to claim 11, wherein
the operations further comprise:
selecting, in response to determining that the original source application is not installed locally, a download address from the download address set as a target download address, and presenting a download interface indicated by the target download address.

14. The non-transitory computer readable storage medium according to claim 13, wherein the selecting a download address from the download address set as a target download address comprises:
determining whether a first download address associated with a locally installed first application for downloading an application is included in the download address set, and if the first download address associated with the locally installed first application for downloading an application is included in the download address set, using the first download address as the target download address.

15. The non-transitory computer readable storage medium according to claim 14, wherein the download address set comprises a download address pointing to the webpage; and
the selecting a download address from the download address set as a target download address comprises:
in response to determining that the first download address is not included in the download address set, using the download address pointing to the webpage in the download address set as the target download address.

* * * * *